United States Patent [19]

Humpolik et al.

[11] Patent Number: 4,576,223
[45] Date of Patent: Mar. 18, 1986

[54] HEAT EXCHANGER AND PROCESS FOR ITS MANUFACTURE

[75] Inventors: Bohumil Humpolik, Ludwigsburg; Vlastimil Kluna, Kornwestheim; Wilfried Winterer, Leinfelden; Reinhold Kuchelmeister, Waldenbuch; Jürgen Bayer, Esslingen, all of Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 562,819

[22] Filed: Dec. 19, 1983

[30] Foreign Application Priority Data

Dec. 22, 1982 [DE] Fed. Rep. of Germany ....... 3247502

[51] Int. Cl.$^4$ ............................................. F28F 9/26
[52] U.S. Cl. ..................................... 165/79; 165/149; 165/175; 165/178; 165/906
[58] Field of Search ................. 165/79, 173, 175, 178, 165/149, 151, DIG. 9, 76

[56] References Cited

U.S. PATENT DOCUMENTS

| 4,085,728 | 4/1978 | Tomchak | 165/76 X |
| 4,266,604 | 5/1981 | Sumikawa et al. | 165/178 X |
| 4,479,668 | 10/1984 | Jacquet | 165/178 X |

FOREIGN PATENT DOCUMENTS

| 2125671 | 12/1971 | Fed. Rep. of Germany . | |
| 1445598 | 8/1976 | United Kingdom | 165/173 |

Primary Examiner—Sheldon J. Richter
Attorney, Agent, or Firm—Schwartz, Jeffery, Schwaab, Mack, Blumenthal & Evans

[57] ABSTRACT

The invention concerns a heat exchanger comprising a heat exchanger block having a plurality of tubes and fins arranged transversely to the tubes, at least one tube plate and a water tank, both made of a synthetic plastic material. The tube plate has orifices to receive the ends of the tubes and the water tank is fastened in a water tight manner to the tube plate. In order to obtain a simple and reliable joint of the heat exchanger tubes with the tube plate and the water tank with the tube plate, the plastic tube plate is provided on one side with projections. The orifices are located in these projections and the ends of the tubes are mounted in these orifices by expansion in the radial direction or impression in the axial direction. Both the tube plate and the water tank are equipped with flat surfaces at their edges. These surfaces rest on each other and the tube plate is joined with the water tank by vibration welding on these surfaces.

16 Claims, 10 Drawing Figures

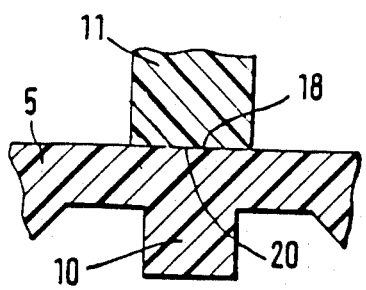
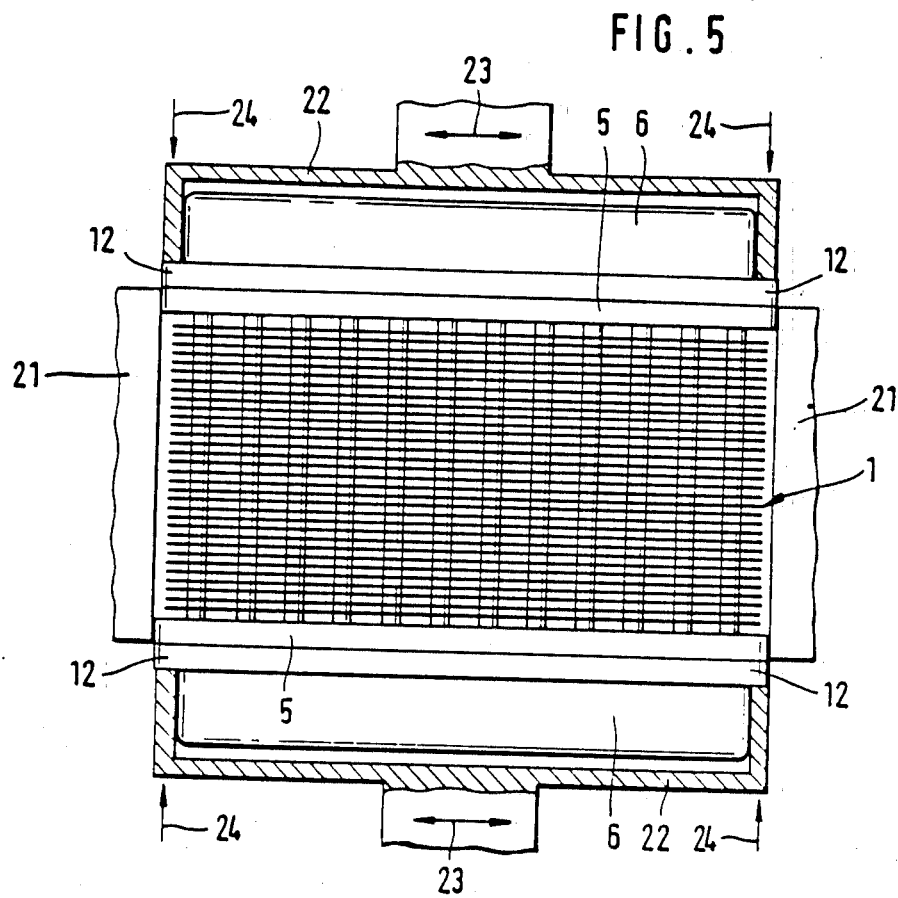
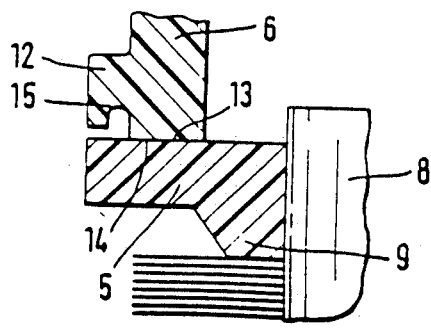

HEAT EXCHANGER AND PROCESS FOR ITS MANUFACTURE

BACKGROUND OF THE INVENTION

The present invention relates to a heat exchanger of the type having a heat exchange block comprising a plurality of tubes and fins extending transversely to the tubes, a synthetic resin tube plate receiving the tubes, and a synthetic resin water tank attached to the tube plate. The invention also concerns a process for manufacturing such a heat exchanger.

A tube/tube plate joint for round tubes of a heat exchanger is known from GB No. 1,445,598. The tube plate is made of metal and is equipped with passages into which the ends of the heat exchanger tubes are inserted. Subsequently, a pressure fit is established through radial expansion of the tube ends, whereby the tube ends are fastened and sealed in the tube plate.

This known process, because of the necessary material properties, is applicable only when metal tube plates are used. In the case of heat exchangers with metal tube plates, a water tank formed of synthetic plastic material can be connected to the tube plate only with mechanical connectors. Thus, a separate sealing element, usually in the form a rubber gasket, is required.

From DE-OS No. 21 25 671 a process for the production of radiators with tube plates consisting of a synthetic plastic material is known. In the process, the plastic material of the tube plates is gradually melted by the application of ultrasonic vibrations and simultaneously the tubes penetrate the plate under pressure. The joining of the water tank with the tube plate is again effected by the application of ultrasonic vibrations to the boundary layers in contact with each other, whereby they are gradually made to melt and are thus welded together.

In the ultrasonic welding method, the necessary welding heat is generated by boundary layer friction. Thus, the vibrations produced by this method must be perpendicular to the surface being welded. Difficulties with the introduction of the vibration often arise depending on the configuration of the parts to be joined together. Consequently, in ultrasonic welding, configuration guidelines concerning the shape of the parts and the position of the directional energy guides must be observed with high accuracy. Furthermore, in this method, tolerances must be kept extraordinarily small, so that satisfactory welding may occur at all. Actual practice has also shown that ultrasonic welding is practical only for small or medium sized parts. It is difficult furthermore to obtain the strength and tightness required of heat exchangers under pressure by the ultrasonic welding process.

SUMMARY OF THE INVENTION

It is therefore an object of the present invention to provide a heat exchanger wherein both the joining of the heat exchanger tubes and the connection of the water tank with the tube plate may be effected in a simple manner.

A further object of the present invention is to provide a heat exchanger having joints having a high mechanical strength and which are reliably tight. Another object of the present invention is to provide a heat exchanger having a tube plate which is as thin as possible in order to enhance material savings. A further object of the invention is to provide a process for the manufacture of a heat exchanger.

In accordance with the above and other objects, the present invention is a heat exchanger comprising at least one tube plate formed of synthetic resin material, the tube plate including one side having a plurality of projections, a plurality of orifices located, respectively, in the projections, and an edge area having a continuous flat surface. A plurality of tubes have their ends pressure fitted into the orifices. A plurality of fins are connected to the tubes, the fins and the tubes defining a heat exchanger block. A water tank commprising synthetic resin material is provided with a rim having a continuous flat surface resting on the continuous flat surface of the tube plate. The tube plate and the water tank are connected by vibration welding at the continuous flat surfaces.

In accordance with other aspects of the invention the fins extend transversely to the tubes.

The tubes are pressure fitted in the orifices by expansion in the radial direction or by impression in the axial direction.

The water tank may also include a partition, the partition being vibration welded to the tube plate. The tube plate may have a second flat surface, and the partition may have a flat surface, the tube plate second flat surface being vibration welded to the partition flat surface.

Further, the tube plate may include a partition which has a flat surface, and the water tank may have a flat surface vibration welded to the tube plate partition flat surface.

The invention may also include at least one groove formed along at least one of the flat surfaces to act as a receptacle for weld bead.

The tube plate may also include longitudinal sides having shoulders for guiding the water tank along the tube plate during vibration welding.

The projections may be arranged in two rows, and a land may be positioned between the two rows, the land having a height approximately equal to the projections and extending for the full length of the tube plate.

In accordance with the above objects, the present invention also provides a process for the production of a heat exchanger comprising a heat exchanger block having a plurality of tubes and a plurality of fins connected to the tubes, a water tank formed of synthetic resin material, and a tube plate formed of synthetic resin material, the tube plate having a plurality of orifices for receiving the tubes. The method comprises fitting the ends of the tubes in the orifices, setting the water tank in place on the tube plate, holding the heat exchanger block in a first fixture, holding the water tank in a second fixture, vibrating the fixtures relative to one another while simultaneously applying pressure to the fixtures to hold the water tank against the tube plate to vibration weld the water tank to the tube plate.

In accordance with other aspects, the invention comprises vibrating the water tank and the tube plate relative to one another with a frequency of approximately 100 Hz and an amplitude of approximately 2 to 4 mm for approximately 3 to 5 seconds.

Partially crystalline materials, for example polypropylene or polyamide, are particularly suitable materials for the tube plate and the water tank.

Further objects, features and advantages of the present invention will become apparent as the invention becomes more fully understood from the detailed description to follow, reference being had to the accompa-

BRIEF DESCRIPTION OF THE DRAWINGS

In the drawings:

FIG. 4 shows the detail Y of FIG. 1 at a larger scale, FIG. 5 shows a clamped heat exchanger during the vibration welding process of the present invention, FIG. 6 shows a variant of the embodiments of FIG. 2 and FIG. 3.

DETAILED DESCRIPTION OF THE PREFERRED EMBODIMENTS

Figure 1:
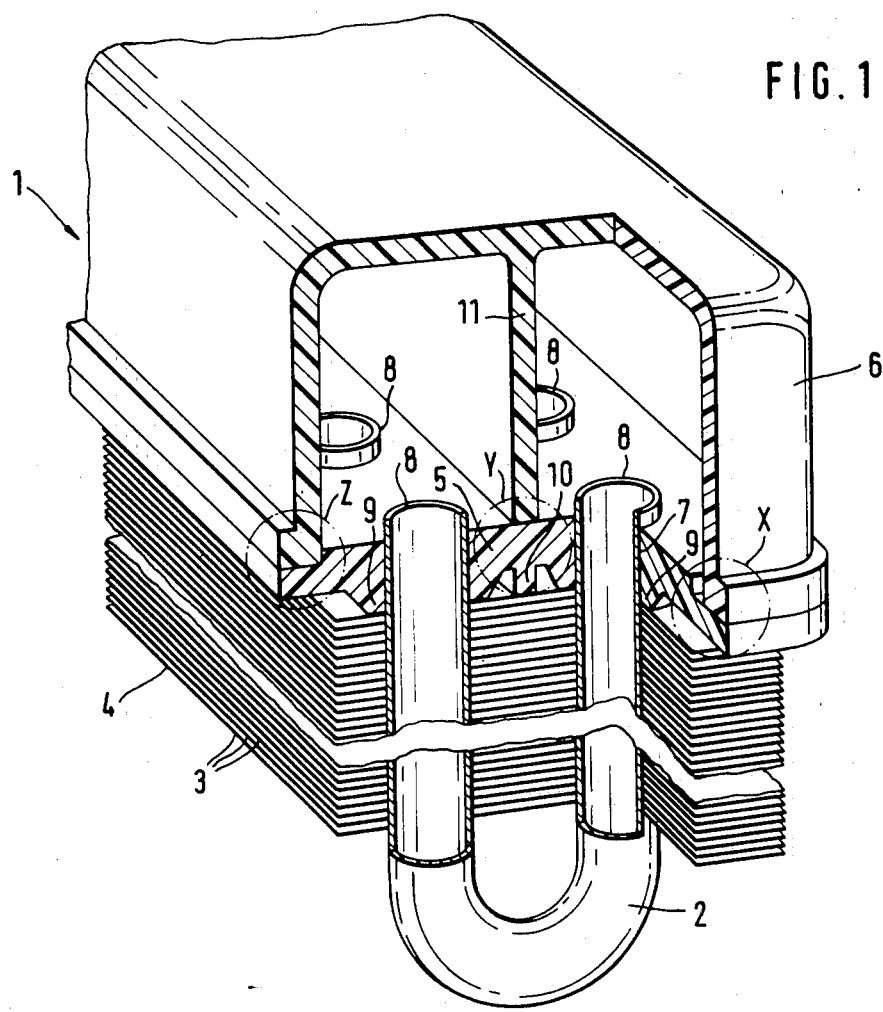
FIG. 1 shows a section through the water tank of a heat exchanger according to the present invention.

The heat exchanger according to the present invention has the advantages that the tube plate and the water tank may be produced in a simple configuration of parts, and in a simple manner using synthetic plastic material. The tube plate may be produced with relatively thin walls. However, in spite of its slight thickness, the strength of the tube plate is adequate for the impression or expansion of the heat exchanger tubes in the tube plate orifices. The impression of heat exchanger tubes in their longitudinal direction into orifices of a tube plate consisting of a synthetic plastic material is described in German Pat. No. 32 42 072, the disclosure of which is hereby incorporated by reference.

A further advantage is that partition walls arranged in the water tank are joined with the tube plate without an additional effort and without separate sealing elements, simultaneously with the edge welding of the water tank, by vibration welding. Consequently, a preferred further development of the invention consists in the water tank having a partition with a flat surface resting on a flat surface of the tube plate or on a flat surface of a partition arranged on the tube plate. The partition of the water tank is joined to the tube plate or the opposite partition, respectively, by means of vibration welding. For the simultaneous joining of the partition with the tube plate, it is immaterial whether the joint of the partition with the tube plate is located in the same or another joining plane as the surfaces for the connection of the water tank with the tube plate at the edges.

During the welding of the material, a weld bead may be formed at the edges of the joining surfaces. It is advantageous therefore to provide along the flat surfaces, at least on one side, a groove to serve as a receptacle for the weld bead and to effect the heat flux during vibration welding. To fixedly align the water tank with respect to the tube plate, the tube plate may include, on its longitudinal sides, a shoulder which serves to guide the water tank along the tube plate during vibration welding.

Preferably, the projections in which the orifices to receive the heat exchange tubes are arranged have conical or cylindrical configurations and are located on the side facing the heat exchange block of the tube plate.

A further advantageous embodiment of the invention consists of providing the orifices with one or several groove or grooves extending in the circumferential direction. These grooves on the one hand contribute to the formation of several sealing edges and on the other hand may serve as collectors for hardenable sealing material. In a similar manner, the ends of the round tubes may have circumferential grooves on their jacketing surface. In order to prevent the circulation of so-called "false air", it is proposed to arrange between two rows of projections a land extending over the entire length of the tube plate, the height of which is at least equal to the height of the projections against which the fins adjacent to the tube plate abut.

FIG. 1 shows a heat exchanger 1 consisting of a heat exchanger block 4 comprising a U-shaped tube 2, fins 3 and a water tank 6. A tube plate 5 has orifices 7 to receive the ends 8 of the U-shaped tubes 2. The tube plate has a plurality of conical projections 9 on its bottom side, surrounding the orifices 7. Between the two rows of conical projections 9, a land 10 is located. Land 10 extends over the entire length of the tube plate 5 and the uppermost fin 3 rests against this land. The tube plate 5 (as explained in detail hereinbelow in connection with FIG. 2) is equipped at its edge with a flat surface, to which the water tank is joined by means of vibration welding. The water tank 6 has a partition 11 extending over the entire length of the water tank 6 which again is joined with the plate 5 by vibration welding. The joining of the partition 11 to the plate 5 is described in detail in connection with FIG. 4.

Figure 2:
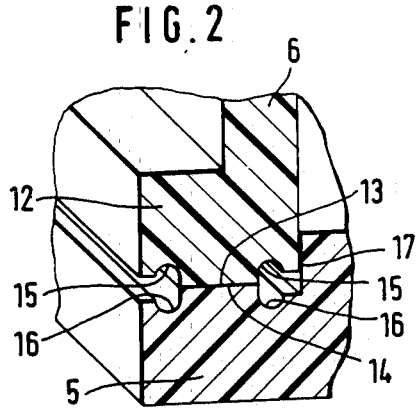
FIG. 2 shows the detail Z of FIG. 1 at a larger scale.

FIG. 2 shows the detail Z of FIG. 1 in an enlarged scale taken at a section of the joining arrangement at the longitudinal side of the water tank 6. The water tank 6 has an extended rim 12, provided at its side facing the tube plate 5 with a flat surface 13. This flat surface 13 extends along the entire rim 12 and rests on a corresponding flat surface 14 at the edge of the tube plate 5. At the outside and toward the inside of the water tank, the flat surfaces 13 and 14 are bounded by grooves 15 and 16. The grooves 15 and 16 serve on the one hand to receive the weld bead and on the other to affect the heat flux during vibration welding. The tube plate 5 has a shoulder 17 against which the rim 12 of the water tank 6 rests and along which it is displaceably guided in the longitudinal direction.

Figure 3:
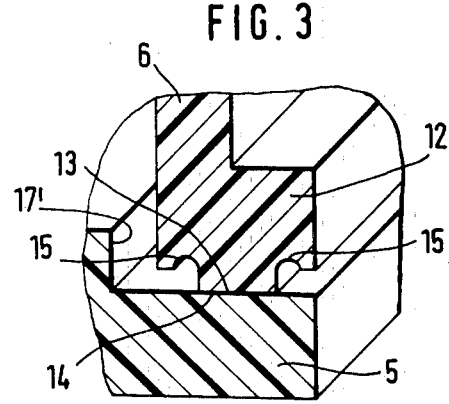
FIG. 3 shows the detail X of FIG. 1 at a larger scale.

FIG. 3 shows the detail X of FIG. 1, which, in contrast to FIG. 2, shows not the longitudinal side of the water tank 6 but its narrow side. For parts identical with those in FIG. 2 the same reference symbols are used. As seen in FIG. 3, on the narrow side of the water tank 6, a shoulder 17' of the tube plate 5 is at a distance from the rim 12 of the water tank 6. This spacing is provided in order to make movement of the water tank 6 with respect to the tube plate 5 possible for vibration welding. The tube plate 5 has on its narrow side a flat surface 14 not bordered by grooves 16; it could, however, be equipped with a groove 16 toward the inside of the water tank, which, in view of the vibration movement proceeding transversely to the grooves, must be offset at least by the amount of the amplitude of the vibration in the direction of the shoulder 17'.

FIG. 4 shows the detail Y of FIG. 1. In FIG. 4, the joining of the partition 11 with the tube plate 5 is represented. The partition 11 has a flat joining surface 18 on its bottom side. This joining surface 18 rests on a flat surface 20 of the tube plate 5.

FIG. 5 shows a heat exchanger 1 clamped in a chuck 21, with the narrow sides of the tube plates 5 being held by the elements of the chuck 21. Each of the water tanks 6 is received by a hood like device 22, so that the water tanks 6 perform the vibrating movement according to the arrows 23 while a contact pressure is simultaneously applied to the rims 12 of the water tanks 6 in the direction of the arrows 24. The vibrating movement is kept as small as possible, the frequency of the vibrations being approximately 100 Hz and the amplitude being approximately 2–4 mm. The time required for the production of the weld joint is affected, among others, by the properties of the material being welded. Preferably, partially crystalline materials are appropriately used for the vibration welding process. These materials include, polypropylene and polyamide. The material is preferably the same in both of the parts to be joined.

FIG. 6 shows a variant of the embodiment of the water tank/tube plate joint according to FIGS. 2 and 3. The tube plate 5 is completely flat on its top side (without a shoulder 17) over the entire edge, i.e. the edge is identical on the narrow and longitudinal sides. The rim 12 of the water tank 6 has a groove 15 only on the outer side of the joining surface 13.

Figure 7:
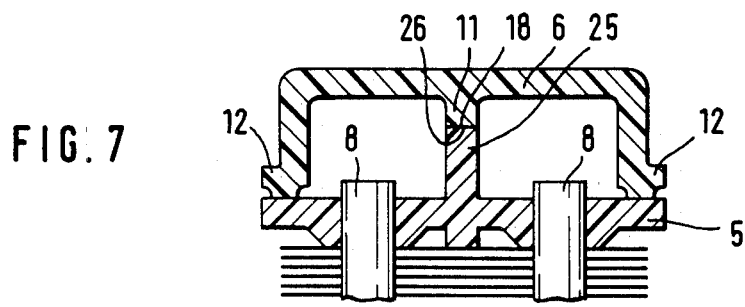
FIG. 7 is a schematic view of two flat vibration welded joints.

FIG. 7 shows a water tank 6 mounted by means of vibration welding, with the welding affected in two different planes. The joining of the rim 12 of the water tank 6 with the tube plate 5 corresponds to the configurations described as examples in connection with FIG. 2, 3 or 6. Between the rows of the tube ends 8, the tube plate 5 has an upright partition 25 directed at the partition 11 formed onto the water tank 6. The upper limiting surface 26 of the partition 25 is connected with the surface 18 of the partition 11. The weld joint in the area of the surfaces 18 and 26 is thus located in a plane different from the joint at the rim 12 of the water tank 6 with the tube plate 5.

Figure 8:
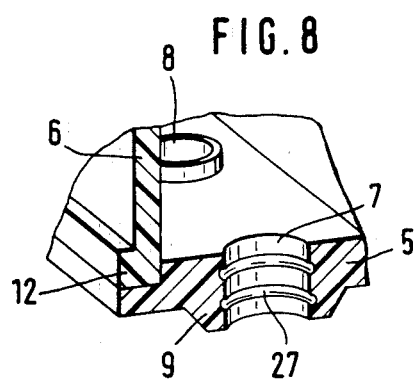
FIG. 8 shows a section through an orifice of the tube plate.

In FIG. 8, a section is shown through an orifice in the tube plate 5 to receive the heat exchanger tubes. This view shows that in the wall of the orifice 7 two grooves 27 are arranged extending in the circumferential direction. Upon the expansion of the tubes, the tube material is pressed partially into the grooves 27, resulting in increased mechanical strength and a better sealing of the joint between the tube and the tube plate.

Figure 9:
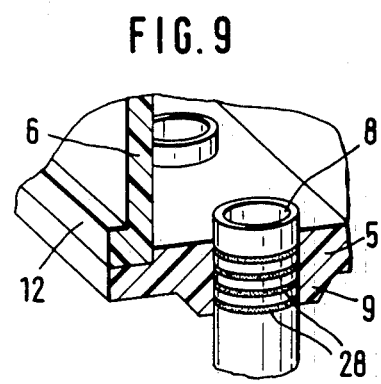
FIG. 9 is a variant of the section of FIG. 8.

FIG. 9 shows that in place of the grooves 27 in the orifice 7, grooves 28 are provided on the jacketing surface of the tube. Grooves 28 extend in the circumferential direction and serve to receive a sealing substance. A hardenable synthetic resin is especially suitable as the sealing substance.

Figure 10:
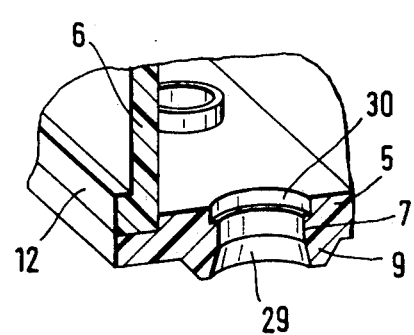
FIG. 10 is a second variant of the section of FIG. 8.

FIG. 10 shows an arrangement similar to that of FIG. 8. In FIG. 10, however, the orifice 7 is equipped at its bottom side with an inlet cone 29 and at its end facing the inside of the water tank with a step 30. The step 30 provides an expanded diameter of the orifice 7. The inlet cone 29 facilitates the introduction of tubes, especially if the tubes are to be fastened to the tube plates by pressure in the axial direction. The step 30 provides an additional sealing edge if the tubes are expanded at the step 30, either by means of a tool or during the axial impression as the result of the elastic properties of the tube material.

The foregoing description is presented for the purpose of illustrating the present invention but is not meant to limit the scope thereof. Clearly, numerous substitutions, additions or other changes could be made without departing from the scope of the invention as set forth in the appended claims.

What is claimed is:

1. A heat exchanger comprising:
   at least one tube plate comprising synthetic resin material, said tube plate including one side having a plurality of projections, a plurality of orifices located, respectively, in said projections, and an edge area having a first continuous flat surface;
   a plurality of tubes, said tubes having ends mounted, respectively, in said orifices, said tube ends being pressure fitted into said orifices;
   a plurality of fins connected to said tubes, said fins and said tubes defining a heat exchanger block;
   a water tank comprising synthetic resin material and having a rim with a second continuous flat surface resting on said first continuous flat surface of said tube plate;
   a first vibration weld for connecting said first and second continuous flat surfaces, and disposed between the first and second surfaces;
   at least one side groove formed along at least one of said flat surfaces, wherein said first vibration weld includes a weld bead disposed in said groove.

2. A heat exchanger as set forth in claim 1 wherein said fins extend transversely to said tubes.

3. A heat exchanger as set forth in claim 1 wherein said tubes are pressure fitted in said orifices by expansion in the radial direction.

4. A heat exchanger as set forth in claim 1 wherein said tubes are pressure fitted in said orifices by impression in the axial direction.

5. A heat exchanger as set forth in claim 1 wherein said tube plate includes longitudinal sides having shoulders for guiding said water tank along said tube plate during vibration welding.

6. A heat exchanger as set forth in claim 1 wherein said projections are annular and face toward said heat exchanger blocks.

7. A heat exchanger as set forth in claim 1 including at least one circumferential groove formed in each orifice.

8. A heat exchanger as set forth in claim 1 wherein each said orifice has an end facing said water tank and an opposite end, a step expanding said orifice formed on said end facing said water tank, and an inlet cone on said opposite end.

9. A heat exchanger as set forth in claim 1 wherein said tube ends include external circumferential grooves.

10. A heat exchanger as set forth in claim 1 wherein said projections are arranged in two rows, and including a land positioned between said two rows, said land having a height approximately equal to said projections and extending for the full length of said tube plate.

11. A heat exchanger as set forth in claim 1 wherein said tube plate and said water tank comprise a partially crystalline material.

12. A heat exchanger as set forth in claim 1 wherein said water tank includes a first partition, and a second vibration weld for connecting the first partition with said tube plate.

13. A heat exchanger as set forth in claim 12 wherein said tube plate has a fourth flat surface; wherein said first partition has a third flat surface; and wherein said second vibration weld is disposed between said third and fourth flat surfaces.

14. A heat exchanger as set forth in claim 12 wherein said tube plate includes a second partition, wherein said first partition includes a third flat surface, wherein said second partition includes a fourth flat surface, and wherein said second vibration weld is disposed between said third and fourth flat surfaces.

15. A heat exchanger as set forth in claim 12 wherein the second vibration weld of said water tank partition to said tube plate is in a different plane from the first vibration weld of said water tank to said tube plate.

16. A heat exchanger as set forth in claim 12 wherein the second vibration weld of said water tank partition to said tube plate is in approximately the same plane as the first vibration weld of said water tank to said tube plate.

* * * * *